United States Patent [19]

Bowden et al.

[11] 3,818,016

[45] June 18, 1974

[54] HALOGENATED PYRIDINE DERIVATIVES

[75] Inventors: Roy Dennis Bowden; Thomas Seaton, both of Runcorn, England

[73] Assignee: Imperial Chemical Industries Limited, London, England

[22] Filed: Aug. 14, 1972

[21] Appl. No.: 280,197

[30] Foreign Application Priority Data
Aug. 25, 1971  Great Britain.................... 39839/71
Mar. 15, 1972  Great Britain.................... 12080/72

[52] U.S. Cl.......................................... 260/290 HL
[51] Int. Cl............................................ C07d 31/26
[58] Field of Search..................................... 260/290

[56] References Cited
UNITED STATES PATENTS
1,977,662   10/1934   Wibaut et al........................ 260/290

Primary Examiner—Harry I. Moatz
Attorney, Agent, or Firm—Cushman, Darby and Cushman

[57] ABSTRACT

Bromofluoropyridines are prepared by vapour-phase bromination of fluoropyridines at a temperature of at least 300°C, the fluoropyridines haeing 1 to 4 fluorine atoms in the pyridine ring and having at least one unsubstituted hydrogen and/or a chlorine atom in the pyridine ring.

15 Claims, No Drawings

HALOGENATED PYRIDINE DERIVATIVES

This invention relates to halogenated pyridine derivatives and more particularly to bromofluoropyridines and to a process for their preparation.

According to the present invention there is provided a process for the preparation of a bromofluoropyridine which comprises interacting bromine in the vapour phase at an elevated temperature with a fluoropyridine, the said fluoropyridine having one to four fluorine atoms in the pyridine ring and having at least one unsubstituted hydrogen and/or a chlorine atom.

The fluorinated starting material may contain substituents other than chlorine, for example bromine.

Suitable fluoropyridines which may be used as starting materials include 2-fluoropyridine which may be brominated to give 6-bromo-2 fluoropyridine,3,6 dibromo-2-fluoropyridine, 4,6-dibromo-2-fluoropyridine, 5,6-dibromo-2-fluoropyridine, 4,5,6-tribromo-2-fluoropyridine, 3,5,6-tribromo-2-fluoropyridine, 3,4,6-tribromo-2-fluoropyridine and 3,4,5,6-tetrabromo-2-fluoropyridine; 3-fluoropyridine which may be brominated to give 2-bromo-3-fluoropyridine, 6-bromo-3-fluoropyridine, 2,6-dibromo-3-fluoropyridine, 2,4,6-tribromo-3-fluoropyridine, 2,5,6-tribromo-3-fluoropyridine and 2,4,5,6-tetrabromo-3-fluoropyridine; 2,4-difluoropyridine which may be brominated to give 6-bromo-2,4-difluoropyridine, 3,6-dibromo-2,4-difluoropyridine, 5,6-dibromo-2,4-difluoropyridine and 3,5,6-tribromo-2,4-difluoropyridine; and 2,4,6-trifluoropyridine which may be brominated to give 3-bromo-2,4,6-trifluoropyridine and 3,5-dibromo-2,4,6-trifluoropyridine; 2,4,5,6-tetrafluoro-3-chloropyridine which may be brominated to give 3-bromo-2,4,5,6-tetrafluoropyridine; and 3,5-dichlorotrifluoropyridine which may be brominated to give 3-bromo-5-chloro-2,4,6-trifluoropyridine.

The following compounds are novel compounds:
6-bromo-2-fluoropyridine
3,6-dibromo-2-fluoropyridine
4,6-dibromo-2-fluoropyridine
5,6-dibromo-2-fluoropyridine
4,5,6-tribromo-2-fluoropyridine
3,5,6-tribromo-2-fluoropyridine
3,4,6-tribromo-2-fluoropyridine
3,4,5,6-tetrabromo-2-fluoropyridine
2,6-dibromo-3-fluoropyridine
2,4,5,6-tetrabromo-3-fluoropyridine
6-bromo-2,4-difluoropyridine
3,5,6-tribromo-2,4-difluoropyridine
3-bromo-2,4,6-trifluoropyridine
3,5-dibromo-2,4,6-trifluoropyridine
3-bromo-2,4,5,6-tetrafluoropyridine
3-bromo-5-chloro-2,4,6-trifluoropyridine The bromination reaction may be carried out over a wide range of temperature and preferably in the range from 300°C to 800°C, especially in the range from 550°C to 700°C.

In general, it is preferred to use at least 2 moles of bromine for example 2 to 15 moles of bromine, for each mole of the fluoropyridine starting material.

Convenient residence times of the mixture in the reaction zone are, for example, between 10 seconds and 100 seconds, though higher or lower residence times may also be used if desired.

The proportions of products obtained are dependent on the fluoropyridine starting materials, the reaction temperatures, the proportion of bromine employed and the residence time. Thus the preparation of the preferred compounds of our invention, namely 3,5-dibromo-2,4,6-trifluoropyridine (from 2,4,6-trifluoropyridine), 3,5,6-tribromo-2,4-difluoropyridine (from 2,4-difluoropyridine), 3-bromo-2,4,5,6-tetrafluoropyridine (from 2,4,5,6-tetrafluoro-3-chloropyridine) and 3-bromo-5-chloro-2,4,6-trifluoropyridine (from 3,5-dichloro-2,4,6-trifluoropyridine) is favoured by the use of molar ratios of bromine to fluoropyridine starting material in the range 8:1 to 10:1 and the use of temperatures in the range from 650°–690°C.

It is preferred to preheat separately the feed of bromine and the feed of the fluoropyridine starting material.

The reactants may be diluted with inorganic diluents, for example, nitrogen and/or steam, or bromine itself or with organic diluents, preferably inert towards bromine; suitable organic diluents include bromofluoroalkanes, for example dibromodifluoromethane or dibromotetrafluoroethane. When a gaseous or volatile diluent is used the fluoropyridine starting material may be vaporised in the stream of diluent vapour which serves as a carrier gas; when a liquid diluent is used, the fluoropyridine starting material may be dissolved in the liquid diluent, for example bromine, and the resulting solution may then be vaporised as a whole.

The reaction may be carried out in the absence of a of a catalyst, but a catalyst may be present if desired, for example a porous material comprising silica, alumina (a mixture or combination of silica and alumina) or carbon. The catalyst may be used in the form of a static bed or a fluidised bed.

The desired bromofluoropyridines may be isolated from the reaction products by conventional techniques, for example by fractional distillation, fractional crystallisation, solvent extraction or a combination of such techniques.

Bromofluoropyridines may be used as chemical intermediates in the preparation of compounds having fungicidal, pesticidal or herbicidal activity. Thus, for example, the preferred compounds of our invention 3,5-dibromo-2,4,6-trifluoropyridine, 3,5,6-tribromo-2,4-difluoropyridine, 3-bromo-2,4,5,6-tetrafluoropyridine and 3-bromo-5-chloro-2,4,6-trifluoropyridine may be converted to the active compounds 3,5-dibromo-2,6-difluoro-4-hydroxypyridine, 2-fluoro-4-hydroxy-3,5,6-tribromopyridine, 3-bromo-4-hydroxy-2,5,6-trifluoropyridine and 3-bromo-5-chloro-2,6-difluoro-4-hydroxypyridine (or salts, esters or ethers thereof) respectively by a process which comprises the step of reacting the said bromofluoropyridines with a metal carboxylate in a non-hydroxylic solvent and which is described in our co-pending UK Applications No. 39836/71 and No. 12081/72.

Further, 3,5-dibromo-2,4,6-trifluoropyridine and 3,5,6-tribromopyridine-2,4-difluoropyridine may be converted to the active compounds 3,5-dibromo-2,6-difluoro-4(4-nitro-2-trifluoromethyl anilino) pyridine and 2-fluoro-3,5,6-tribromo-4(4-nitro-2-trifluoromethyl anilino) pyridine by reacting the said bromofluoropyridines with 4-nitro-2-trifluoromethylaniline as described in our co-pending UK Application No. 7291/71.

The invention is illustrated but not limited by the following Examples:

EXAMPLE 1

3-fluoropyridine was fed to a vaporiser maintained at 300°C. The issuing vapour (0.16 mole/hour) was passed to a vertical glass tubular reactor of 2 inch bore maintained at 590°C (± 10°C) where it was mixed with bromine vapour (0.91 mole/hour; preheated to 100°C). The residence time, calculated on the basis of the flow rates at the reaction temperature was 30 seconds. The gaseous reactor effluent was condensed and collected in cooled methylene chloride. The resulting solution was washed with N/1 sodium hydroxide solution to remove acids and bromine and the solvent was removed by evaporation. The residual oil was purified by distillation.

The products thus obtained and their percentage yields (based on the amount of fluoropyridine starting material) are as shown below:

| | |
|---|---|
| 2-bromo-3-fluoropyridine/ 6-bromo-3-fluoropyridine (molar ratio 1:1) | 15% |
| 2,6-dibromo-3-fluoropyridine | 40% |
| 2,4,6-tribromo-3-fluoropyridine/ 2,5,6-tribromo-3-fluoropyridine (molar ratio 1:2) | 25% |
| 2,4,5,6-tetrabromo-3-fluoropyridine | 10% |

The novel products were characterised by the following physical and spectral data:
2,6-dibromo-3-fluoropyridine
M. P. 71°–72°C
I. R. $\nu$(nujol) 1570, 1430, 1395, 1265, 1070, 830, 820 cm$^{-1}$
$F^{19}$ NMR $\delta$(CCl$_4$) 115.1 ppm from CFCl$_3$
N. M. R. $\delta$(CCl$_4$) 7.27 and 7.41 (relative intensities 1:1)
M. S. $M/e$ = 253 (C$_5$H$_2$FBr$_2$$^{79}$N has $M/e$ = 253)
2,4,5,6-tetrabromo-3-fluoropyridine
M. P. 133°–134°C
$F^{19}$ NMR $\delta$(CCl$_4$) 99.6 ppm from CFCl$_3$
I. R. $\nu$max. (nujol) 1530, 1315, 1110, 755 cm$^{-1}$
M. S. $M/e$ = 409 (C$_5$FBr$_4$$^{79}$N has $M/e$ = 409)

EXAMPLE 2

3-fluoropyridine was fed to a vaporiser maintained at 300°C. The issuing vapour (0.12 mole/hour) was passed to a vertical glass tubular reactor of 2 inch bore maintained at 590°C (± 10°C) where it was mixed with bromine vapour (0.94 mole/hour; preheated to 100°C). The residence time, calculated on the basis of the flow rates at the reaction temperature was 40 seconds. The gaseous reactor effluent was condensed and collected in cooled methylene chloride. The resulting solution was washed with N/1 sodium hydroxide solution to remove acids and bromine and the solvent was removed by evaporation. The residual oil was purified by distillation.

The products thus obtained and their percentage yields (based on the amount of fluoropyridine starting material) are as shown below:

| | |
|---|---|
| 2,6-dibromo-3-fluoropyridine | 20% |
| 2,4,6-tribromo-3-fluoropyridine 2,5,6-tribromo-3-fluoropyridine (molar ratio 1:2) | 40% |
| 2,4,5,6-tetrabromo-3-fluoropyridine | 25% |

The novel products 2,6-dibromo-3-fluoropyridine and 2,4,5,6-tetrabromo-3-fluoropyridine were characterised by the physical and spectral data as shown in Example 1.

EXAMPLE 3

2,4-difluoropyridine was fed to a vaporiser maintained at 300°C. The issuing vapour (0.15 mole/hour) was passed to a vertical glass tubular reactor of 2 inch bore maintained at 590°C (± 10°C) where it was mixed with bromine vapour (0.91 mole/hour). The residence time, calculated on the basis of the flow rates at the reaction temperature was 30 seconds. The gaseous reactor effluent was condensed and collected in cooled methylene chloride. The resulting solution was washed with N/1 sodium hydroxide solution to remove acids and bromine and the solvent was removed by distillation. The residual oil was purified by distillation.

The products thus obtained and their percentage yields (based on the amount of fluoropyridine starting material) are as shown below:

| | |
|---|---|
| 6-bromo-2,4-difluoropyridine | 20% |
| 3,6-dibromo-2,4-difluoropyridine 5,6-dibromo-2,4-difluoropyridine (molar ratio 2:3) | 20% |
| 3,5,6-tribromo-2,4-difluoropyridine | 10% |

The novel products were characterised by the following physical and spectral data:
6-bromo-2,4-difluoropyridine
I. R. $\nu$ max (liquid) 1600, 1410, 1155, 1115, 980, 860 cm$^{-1}$
$F^{19}$ N. M. R. $\delta$ (CCl$_4$) 62.1 and 96.1 and 96.2 ppm from CFCl$_3$ (relative intensities 1:1)
N. M. R. $\delta$ (CCl$_4$) 6.69 and 7.22 ppm (relative intensities 1:1)
M. S. $M/e$ = 193 (C$_5$H$_2$F$_2$Br$^{79}$N has $M/e$ = 193)
3,5,6-tribromo-2,4-difluoropyridine
M. P. 30°–35°C b.p. 83°–85°C at 0.6 mm Hg pressure
I.R. $\nu$ max (nujol) 1575, 1540, 1280, 1040, 875, 735, 700 cm$^{-1}$
$F^{19}$ NMR $\delta$ (CCl$_4$) 61.9 and 75.8 ppm from CFCl$_3$ (relative intensities 1:1)
M. S. $M/e$ = 349 (C$_5$F$_2$Br$_3$$^{79}$N has $M/e$ = 349)

EXAMPLE 4

2,4-difluoropyridine was fed to a vaporiser maintained at 300°C. The issuing vapour (0.18 mole/hour) was passed to a vertical silica tubular reactor of 2 inch bore maintained at 665°C (± 10°C) where it was mixed with bromine vapour (1.82 mole/hour; preheated to 100°C). The residence time, calculated on the basis of the flow rates at the reaction temperature was 23 seconds. The gaseous reactor effluent was condensed and collected in cooled methylene chloride. The resulting solution was washed with N/1 sodium hydroxide solution to remove acids and bromine and the solvent was removed by distillation. The residual oil was purified by distillation.

The products thus obtained and their percentage yields (based on the amount of fluoropyridine starting material) are as shown below:

| | |
|---|---|
| 6-bromo-2,4-difluoropyridine 2,6-dibromo-2,4-difluoropyridine | 5% |

| | |
|---|---|
| 5,6-dibromo-2,4-difluoropyridine (molar ratio 2:3) | 20% |
| 3,5,6-tribromo-2,4-difluoropyridine | 65% |

The novel products 6-bromo-2,4-difluoropyridine and 2,5,6-tribromo-2,4-difluoropyridine were characterised by the physical and spectral data shown in Example 3.

EXAMPLE 5

2,4,6-trifluoropyridine was fed to a vaporiser maintained at 300°C. The issuing vapour (0.15 mole/hour) was passed to a vertical silica tubular reactor of 2 inch bore maintained at 590°C (± 10°C) where it was mixed with bromine vapour (0.91 mole/hour; preheated to 100°C). The residence time, calculated on the basis of the flow rates at the reaction temperature was 30 seconds. The gaseous reactor effluent was condensed and collected in cooled methylene chloride. The resulting solution was washed with N/1 sodium hydroxide solution to remove acids and bromine and the solvent was removed by distillation. The residual oil was purified by distillation.

The products thus obtained and their percentage yields (based on the amount of fluoropyridine starting material) are as shown below:

| | |
|---|---|
| 3-bromo-2,4,6-trifluoropyridine | 30% |
| 3,5-dibromo-2,4,6-trifluoropyridine | 10% |

The novel compounds were characterised by the following physical and spectral data:
3-bromo-2,4,6-trifluoropyridine
  M. P. 38°–39°C
  I. R. $\nu$ max ($CCl_4$) 1620, 1460, 1400, 1270, 1150, 1050 $cm^{-1}$
  $F^{19}$ NMR $\delta$ ($CCl_4$) 62.8, 66.0 and 87.1 ppm from $CFCl_3$ (relative intensities 1:1:1)
  NMR $\delta$ ($CCl_4$) 6.71 ppm
  M. S. $M/\epsilon = 211$ ($C_5HF_3Br^{79}N$ has $M/\epsilon = 211$)
3,5-dibromo-2,4,6-trifluoropyridine
  M. P. 59°–60°C
  I. R. $\nu$ max (nujol) 1600, 1055, 740, 715 $cm^{-1}$
  $F^{19}$ NMR $\delta$ ($CCl_4$) 63.8 and 79.4 ppm from $CFCl_3$ (relative intensities 2:1)
  M. S. $M/\epsilon = 289$ ($C_5F_3Br_2^{79}N$ has $M/\epsilon = 289$)

EXAMPLE 6

2,4,6-trifluoropyridine was fed to a vaporiser maintained at 300°C. The issuing vapour (0.18 mole/hour) was passed to a vertical silica tubular reactor of 2 inch bore maintained at 685°C (± 10°C) where it was mixed with bromine vapour (1.82 mole/hour; preheated to 100°C). The residence time, calculated on the basis of the flow rates at the reaction temperature was 22 seconds. The gaseous reactor effluent was condensed and collected in cooled methylene chloride. The resulting solution was washed with N/1 sodium hydroxide solution to remove acids and bromine and the solvent was removed by distillation. The residual oil was purified by distillation.

The products thus obtained and their percentage yields (based on the amount of fluoropyridine starting material are as shown below:

| | |
|---|---|
| 3-bromo-2,4,6-trifluoropyridine | 10% |
| 3,5-dibromo-2,4,6-trifluoropyridine | 75% |

The novel products 3-bromo-2,4,6-trifluoropyridine and 3,5-dibromo-2,4,6-trifluoropyridine were characterised by the physical and spectral data as shown in Example 5.

EXAMPLE 7

2,4,5,6-tetrafluoro-3-chloropyridine was fed to a vaporiser maintained at 300°C. The issuing vapour (0.11 mole/hour) was passed to a vertical silica tubular reactor of 2 inch bore maintained at 680°C (± 10°C) where it was mixed with bromine vapour (0.90 mole/hour; preheated to 100°C). The residence time, calculated on the basis of the flow rates at the reaction temperature was 45 seconds. The gaseous reactor effluent was condensed and collected in cooled methylene chloride. The resulting solution was washed with N/1 sodium hydroxide solution to remove acids and bromine and the solvent was removed by distillation. The residual oil was purified by distillation to give a product containing 3-bromo-2,4,5,6-tetrafluoropyridine, which is a novel compound, characterised by the following spectral and physical data:
  b.p. 138°–140°
  I. R. $\nu$ max (liquid film) 1625, 1600, 1495, 1450, 1090, 1060, 875 and 865 $cm^{-1}$.
  M. S. $M/\epsilon = 229$ ($C_5F_4Br^{79}N$ has $M/\epsilon = 299$)

EXAMPLE 8

3,5-dichloro-2,4,6-trifluoropyridine was fed to a vaporiser maintained at 300°C. The issuing vapour (0.18 mole/hour) was passed to a vertical silica tubular reactor of 2-inch bore maintained at 680°C (± 10°C) where it was mixed with bromine vapour (1.80 moles/hour; preheated to 100°C). The residence time, calculated on the basis of the flow rates at the reaction temperature was 22 seconds. The gaseous reactor effluent was condensed and collected in cooled methylene chloride. The resulting solution was washed with N/1 sodium hydroxide solution to remove acids and bromine and the solvent was removed by evaporation. The residual oil was purified by distillation to give a product containing 3-bromo-5-chloro-2,4,6-trifluoropyridine, which was characterised by the following physical and spectral data:
  M. P. 37°–39°C
  I. R. $\nu$ (nujol) 1595, 1570, 1080, 1050, 755 and 740 $cm^{-1}$
  $F^{19}$ NMR $\delta$ ($CCl_4$) 65.8, 71.7 and 87.7 ppm from $CFCl_3$ (relative intensities 1:1:1)
  M. S. pmi at $M/\epsilon = 245$ with $Cl_1Br_1$ isotope pattern ($C_5F_3Cl^{35}Br^{79}N$ has $M/\epsilon = 245$)

EXAMPLE 9

2-fluoropyridine was fed to a vaporiser maintained at 320°C. The issuing vapour (0.12 mole/hour) was passed to a vertical glass tubular reactor of 2 inch bore maintained at 615 (± 10°C) where it was mixed with bromine vapour (0.91 mole/hour; preheated to 110°C). The residence time, calculated on the basis of the flow rates at the reaction temperature was 30 seconds. The gaseous reactor effluent was condensed and collected in cooled methylene chloride. The resulting solution was washed with N/1 sodium hydroxide solution to remove acids and bromine and the solvent was removed by evaporation. The residual solid was purified by crystallisation.

The product thus obtained (52 percent yield based on the amount of fluoropyridine starting material) was characterised by the following physical and spectral data as 3,4,5,6-tetrabromo-2-fluoropyridine I. R. $\nu$ max (nujol) 1530, 1315, 1060, 935, 780 and 720 cm$^{-1}$.

F$^{19}$ NMR $\delta$ [(CD$_3$)$_2$ CO] 60.8 ppm from CFCl$_3$

M. S. $M/\epsilon = 409$ (C$_5$F Br$_4$$^{79}$N has M/$\epsilon = 409$)

What we claim is:

1. A process for the preparation of a bromofluoropyridine which comprises interacting bromine in the vapour phase at a temperature of at least 300°C with a fluoropyridine, the said fluoropyridine having one to four fluorine atoms in the pyridine ring and having at least one unsubstituted hydrogen and/or a chlorine atom.

2. A process as claimed in claim 1 wherein the fluoropyridine starting material is 2-fluoropyridine 3-fluoropyridine, 2,4-difluoropyridine, 2,4,6-trifluoropyridine, 2,4,5,6-tetrafluoro-3-chloropyridine or 3,5-dichloro-2,4,6-trifluoropyridine.

3. A process as claimed in claim 1 wherein the proportion of bromine is at least 2 moles per mole of fluoropyridine starting material.

4. A process as claimed in claim 1 wherein the proportion of bromine is 2 to 15 moles per mole of fluoropyridine starting material.

5. A process as claimed in claim 1 wherein the reaction temperature is in the range from 300°C to 800°C.

6. A process as claimed in claim 5 wherein the reaction temperature is in the range 550°C to 700°C.

7. 3,4,5,6-tetrabromo-2-fluoropyridine.
8. 2,6-dibromo-3-fluoropyridine.
9. 2,4,5,6-tetrabromo-3-fluoropyridine.
10. 6-bromo-2,4-difluoropyridine.
11. 3,5,6-tribromo-2,4-difluoropyridine.
12. 3-bromo-2,4,6-trifluoropyridine.
13. 3,5-dibromo-2,4,6-trifluoropyridine.
14. 3-bromo-2,4,5,6-tetrafluoropyridine.
15. 3-bromo-5-chloro-2,4,6-trifluoropyridine.

* * * * *